(12) United States Patent
Udaya et al.

(10) Patent No.: US 12,041,151 B2
(45) Date of Patent: *Jul. 16, 2024

(54) IMPORTATION OF ANALYTICS CLOUD CONTENT INTO CUSTOM LOCATION IN DESTINATION TENANT

(71) Applicant: SAP SE, Walldorf (DE)

(72) Inventors: Sahana Durgam Udaya, Bangalore (IN); Manojna V, Karnataka (IN); Abhishek Nagendra, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,468

(22) Filed: Apr. 27, 2023

(65) Prior Publication Data

US 2023/0262145 A1    Aug. 17, 2023

Related U.S. Application Data

(63) Continuation of application No. 17/546,742, filed on Dec. 9, 2021, now Pat. No. 11,671,516.

(51) Int. Cl.
*H04L 12/00* (2006.01)
*G06F 3/04842* (2022.01)
*H04L 67/06* (2022.01)
*H04L 67/75* (2022.01)

(52) U.S. Cl.
CPC .......... *H04L 67/75* (2022.05); *G06F 3/04842* (2013.01); *H04L 67/06* (2013.01)

(58) Field of Classification Search
CPC ....... H04L 67/75; G06F 3/04842; G06F 8/34; G06F 8/71; G06Q 10/10

USPC .................................................. 709/201, 204
See application file for complete search history.

(56) References Cited

U.S. PATENT DOCUMENTS

| | | | |
|---|---|---|---|
| 8,468,244 B2* | 6/2013 | Redlich | G06Q 50/18 |
| | | | 715/255 |
| 9,426,428 B2* | 8/2016 | Renkis | G06V 20/52 |
| 9,613,190 B2* | 4/2017 | Ford | H04L 63/083 |
| 10,129,211 B2* | 11/2018 | Heath | G06Q 30/02 |
| 10,498,629 B2* | 12/2019 | Sun | G06F 16/9536 |
| 10,594,656 B2 | 3/2020 | Devarajan et al. | |

(Continued)

FOREIGN PATENT DOCUMENTS

CN    113282312 A    8/2021

OTHER PUBLICATIONS

"U.S. Appl. No. 17/546,742, Ex Parte Quayle Action dated Oct. 12, 2022", 9 pgs.

(Continued)

*Primary Examiner* — Frantz Coby
(74) *Attorney, Agent, or Firm* — SCHWEGMAN LUNDBERG & WOESSNER, P.A.

(57) ABSTRACT

In an example embodiment, a graphical user interface-based software tool is provided that uses integrated process information and information of a technical infrastructure to provide automatically-analyze integrations. There are several current approaches to capturing information relevant to the above questions available within a computer system, but each of them only captures a fragment of the information that will be utilized and are not linked. Additionally, most of them do not include extensibility information. The provided tool solves these issues.

20 Claims, 13 Drawing Sheets

(56) References Cited

U.S. PATENT DOCUMENTS

| | | |
|---|---|---|
| 10,762,206 B2 * | 9/2020 | Titonis ................ H04W 12/128 |
| 10,764,254 B2 * | 9/2020 | Ford ..................... H04W 12/02 |
| 10,942,724 B2 | 3/2021 | Spivak et al. |
| 11,146,574 B2 * | 10/2021 | Muddu ................. H04L 43/045 |
| 11,288,395 B2 | 3/2022 | Landman |
| 11,671,516 B1 * | 6/2023 | Udaya .................... H04L 67/06 |
| | | 709/201 |
| 2007/0169081 A1 | 7/2007 | Zhao et al. |
| 2009/0288078 A1 | 11/2009 | Makonahalli |
| 2011/0214118 A1 | 9/2011 | Antill et al. |
| 2020/0371771 A1 | 11/2020 | Liu et al. |
| 2021/0373878 A1 | 12/2021 | Padmanabhan et al. |

OTHER PUBLICATIONS

"U.S. Appl. No. 17/546,742, Notice of Allowance dated Jan. 27, 2023", 9 pgs.

"U.S. Appl. No. 17/546,742, Response filed Oct. 21, 2022 to Ex Parte Quayle Action dated Oct. 12, 2022", 3 pgs.

\* cited by examiner

PORTFOLIO & PROJECT MANAGEMENT

| OVERVIEW | IMPORT OPTIONS | |
|---|---|---|
| • IMPORT SCHEDULE NAME | | |
| • OVERWRITE PREFRENCES | | |

CHOOSE TO OVERWRITE EXISTING OBJECTS OR NOT, WHILE IMPORTING OBJECTS WITH THE SAME NAME AS ON YOUR SYSTEM. NEW OBJECTS WILL ALWAYS BE IMPORTED

- ⊙ DON'T OVERRIDE OBJECTS OR DATA
  CHOOSE THIS OPTION IF YOU WANT TO AVOID OVERWRITING ANY EXISTING CONTENT
- ⊙ OVERWRITE DATA ONLY
  OVERWRITE THE DATA OF EXISTING OBJECT WITHOUT MAKING CHANGES TO THE STRUCTURE OF YOUR MODELS
- ⊙ OVERWRITE OBJECTS AND DATA
  IMPORT ALL SELECTED CONTENT EXISTING OBJECTS CAN BE OVERWRITTEN

☐ INCLUDING PERMISSIONS ⓘ — 602

IMPORT TO — 604

YOU CAN CHOOSE A SUBFOLDER WITHIN THE LOCATION WHERE YOU WANT TO IMPORT — 606, 608

MY FILES/PUBLIC

OVERRIDE FOLDER IMPORT LOCATION ⦿ OFF
ALLOWS YOU TO MODIFY THE IMPORT LOCATIONS OF INDIVIDUAL FOLDERS WITHIN THE PUBLIC FOLDER

CONTENT

IMPORTED CONTENT (0/23)

| | NAME | DESCIPTION | INCLUDE DATA ⓘ | IMPACTED CONTENT | IMPORT LOCATION ⓘ |
|---|---|---|---|---|---|
| ☑ | FOLDERS | | | | |
| ☑ | ☐ MODES | | | | MY FILES/PUBLIC △ |
| ☑ | ☐ SAP_CONTENT | | | | MY FILES/PUBLIC △ |
| ☑ | ☐ SAP_PPM_PROJECT_PORTFOLIO_MANANGEMENT | | | | MY FILES/PUBLIC/SAP_CONTENT |
| | STORIES | | | | |
| ☑ | 🗎 SAP_PPM_PROJECTPORTFOLIO | SAP PORTFOLIO | | | MY FILES/PUBLIC/SAP_CONTENT/ SAP_PPM_PROJECT_PORT.. |
| | MODELS | | | | |
| ☑ | ⊙ SAP_PPM_IM_BUDGETCOSTS | | ☑ | | MY FILES/PUBLIC/MODELS △ |
| ☑ | ⊙ SAP_PPM_IM_PORTFOLIO | | ☑ | | MY FILES/PUBLIC/MODELS △ |
| ☑ | ⊙ SAP_PPM_IM_PORTFOLIOGEO | | ☑ | | MY FILES/PUBLIC/MODELS △ |
| ☑ | DIMENSIONS | | ☑ | | |

610

[ IMPORT ]     [ CLOSE ]

IMPORTATION OF ANALYTICS CLOUD CONTENT INTO CUSTOM LOCATION IN DESTINATION TENANT

CROSS-REFERENCE TO RELATED APPLICATIONS

This application is a continuation of prior application Ser. No. 17/546,742, filed on Dec. 9, 2021, which is incorporated by reference herein in its entirety.

BACKGROUND

An Analytics Cloud is a software component in a cloud that combines organizational intelligence, planning, and predictive capabilities. In an organizational intelligence application, the analytics content, which may include a model, story, visualization, and value driver trees (VDT), plays a central role in discovering unseen patterns to boost organizational productivity.

BRIEF DESCRIPTION OF DRAWINGS

The present disclosure is illustrated by way of example and not limitation in the figures of the accompanying drawings, in which like references indicate similar elements.

FIG. 6 is a diagram illustrating a graphical user interface for selecting destination folder(s) for a package in a destination Analytic Cloud tenant, in accordance with an example embodiment.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Sharing of the analytics content across users is helpful for better collaboration. Additionally, a standard content template can be reused by all users by plugging in their respective data to the template. The infrastructure for sharing the analytics content is called an Analytical Content Network (ACN), while the entity that contains the content to be shared is called a "package."

An ACN is capable of connecting to any Analytic Cloud tenant, and thus it can provision and share content into any Analytic Cloud tenant. ACN also supports a few end-user workflows. First, an Analytic Cloud content creator allows for the creation of Analytic Cloud content in the form of stories, models, dimensions, connections, and VDTs. If authorized, a user can then export this content from the Analytic Cloud tenant to ACN by creating a content package, which can contain any number of these content items. The package can then be shared with multiple tenants. Second, an Analytic Cloud content user can view all the available content packages in their listing and import those packages relevant for their analytic workflows. This includes public content (e.g., templates, demos), restricted content and private content.

Figure 1:
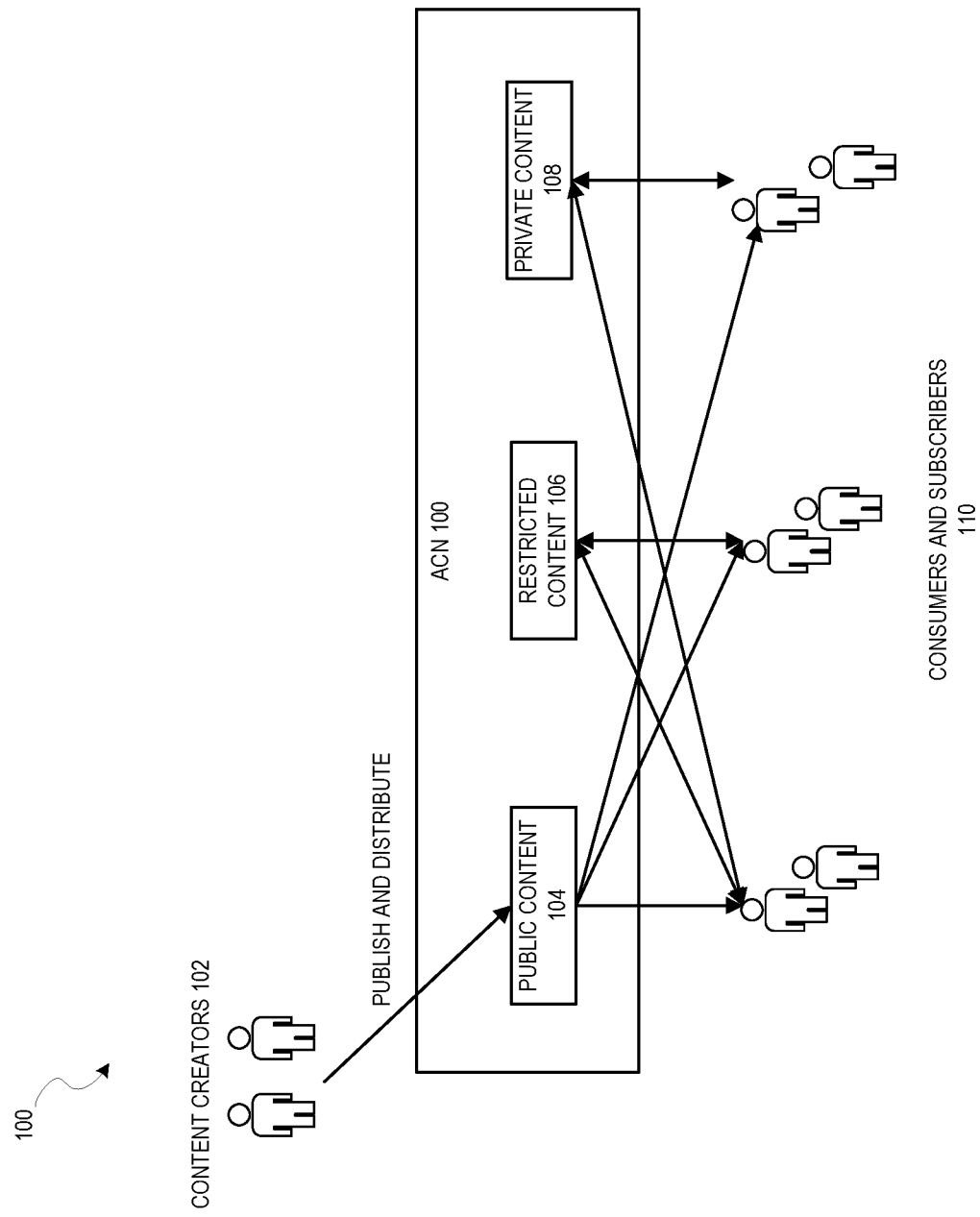
FIG. 1 is a diagram illustrating an architecture for ACN in accordance with an example embodiment.

FIG. 1 is a diagram illustrating an architecture for ACN 100 in accordance with an example embodiment. Here, content creators 102 publish and distribute public content 104, restricted content 106, and private content 108. Consumers and subscribers 110 are able to pull public content 104 on demand, receive push or pull based updates of restricted content 106, and push private content 108, assuming the consumers and subscribers 110 have permission to access the corresponding content.

Figure 2:
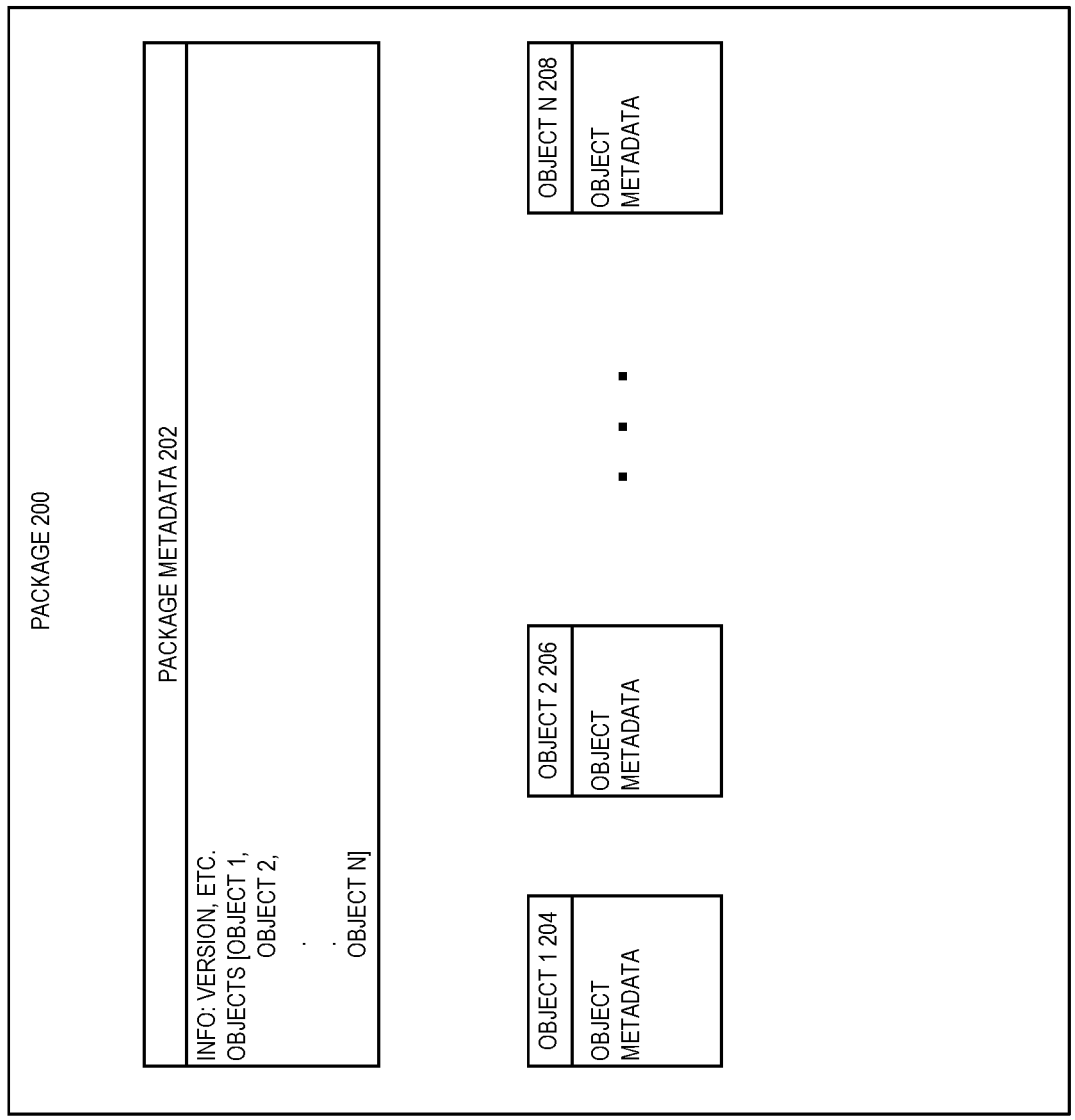
FIG. 2 is a diagram illustrating an example of a package in accordance with an example embodiment.

As mentioned earlier, to achieve sharing across tenants, the content may be bundled into a package. A package contains the details of each object present in the package, as well as dependency information between those objects and an overview that summarizes the content details. FIG. 2 is a diagram illustrating an example of a package 200 in accordance with an example embodiment. Package metadata 202 contains information about the package, including version information and a list of objects in the package. Each objects 204, 206, 206 may then have its own metadata as well.

The following is an example of package metadata, in accordance with an example embodiment.

```
{
  *info*: {
    /* Package version information */
  }
  "objects": [
    {
      "objectType": "RESOURCE",
```

```
        "objectName": "Annual Reports",
        "objectID": "objectIdA",
        "parentResID": "PUBLIC",
        "ancestorPath": [ ]
    },
    {
        "objectType": "RESOURCE",
        "objectName": "New Story",
        "objectID": "objectIdC",
        "parentResID": "ObjectIdB",
        "ancestorPath": [ ]
    },
    {
        "objectType": "RESOURCE",
        "objectName": "Finance Reports",
        "objectID": "objectIdB",
        "parentResID": "ObjectIdA",
        "ancestorPath": [ ]
    },
```

A technical problem is encountered, however, in that a user is unable to group content in a specific location, or simply choose a custom location while importing the content to an Analytic Cloud tenant. Rather, the user must first import the package into the destination tenant (without specifying a location), and then only once the import is complete can the user move the package to a desired location in the destination tenant using a "move to" option or the like.

Technical challenges exist for providing the option to choose location while importing the package. First of all, while it is possible to update the metadata in a future release to include all dependency information in an easy to parse format to allow the structure to be deduced without significant delay, it is difficult to form the path for packages created both before and after such a release. Second, retaining the existing folder location of a resource while performing subsequent imports can be difficult. Third, trickling down a user selected folder location to all descendant objects can be challenging. Fourth, the relationship change between objects based on the user's action would need to be managed.

Figure 3:
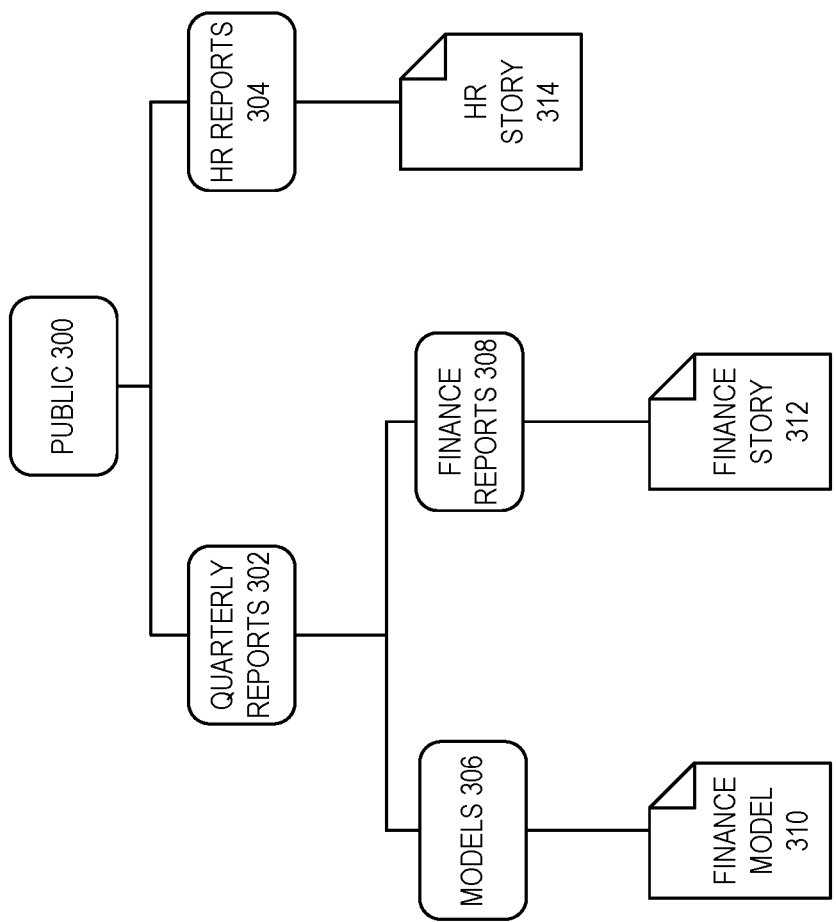
FIG. 3 is a diagram illustrating a package, displayed as a hierarchy, in accordance with an example embodiment.

FIG. 3 is a diagram illustrating a package, displayed as a hierarchy, in accordance with an example embodiment. FIG. 3 depicts the package as it exists prior to being provisioned and shared to as particular Analytic Cloud tenant. Here, a root node 300 contains under it two folders: a quarterly reports folder 302 and an HR reports folder 304. The quarterly reports folder 302 contains under it two additional folders: a models folder 306 and a Finance Reports folder 308. The models folder 306 contains document 310, the Finance Reports folder 308 contains document 312, and the HR reports folder 304 contains document 314. Notably, even though the package contains all these elements in hierarchical format, the metadata for the package may or may not have the hierarchical information stored in an easy-to-parse manner. For example, if the metadata was constructed under an older schema/template, it may contain indications, for each node in the hierarchy, an indication of a parent node.

In an example embodiment, a user wishing to provision and share the package to a particular Analytic Cloud tenant has three options with regards to setting a location or locations for the package. The first would be to elect not to set a location or locations at all, which results in the system simply choosing to install the package at the root level of the destination tenant (in the same hierarchy as the source Analytic Cloud tenant). The second would be to set a destination folder for the entire package. The third would be to set destination folders for each individual folder in the package.

Figure 4:
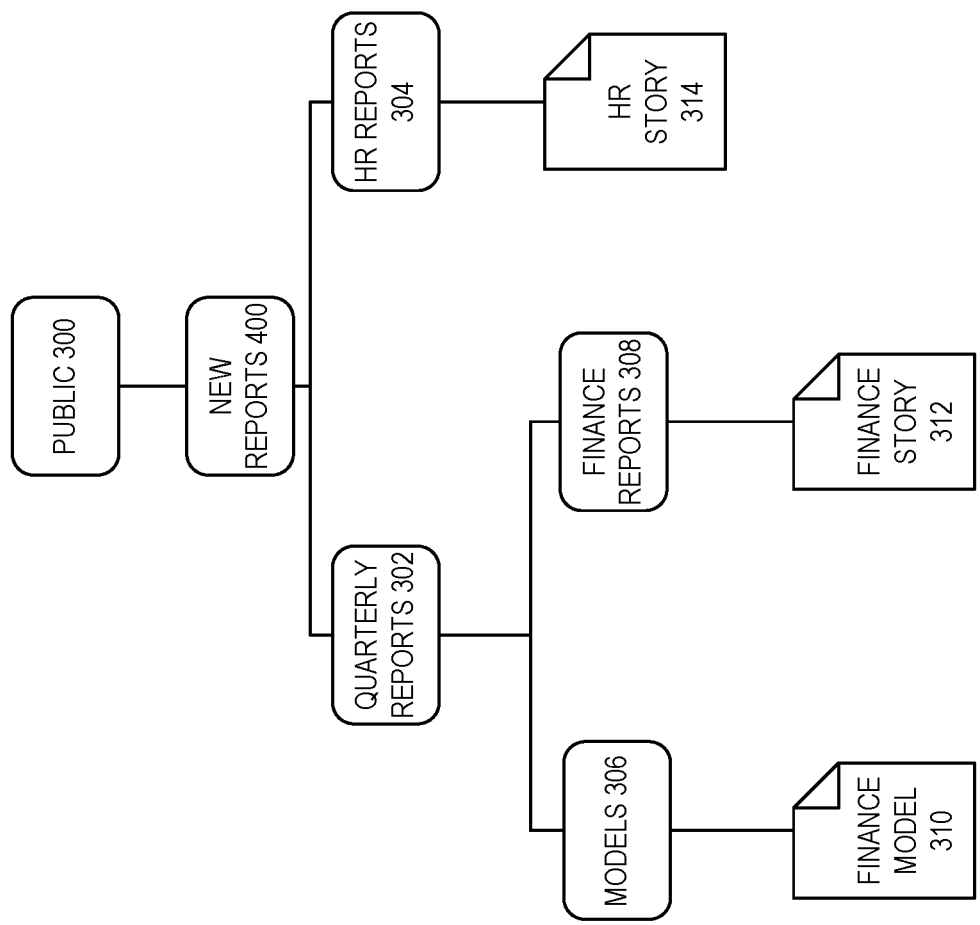
FIG. 4 is a diagram illustrating a package having been provisioned and shared to an Analytic Cloud tenant where a user has selected a destination folder for the entire package, in accordance with an example embodiment.

FIG. 4 is a diagram illustrating a package having been provisioned and shared to an Analytic Cloud tenant where a user has selected a destination folder for the entire package, in accordance with an example embodiment. Here, the user has elected to install the package in a new folder called new reports 400. As can be seen, the entire package from FIG. 3 (with the exception of the root node 300) is then installed inside new reports 400.

Figure 5:
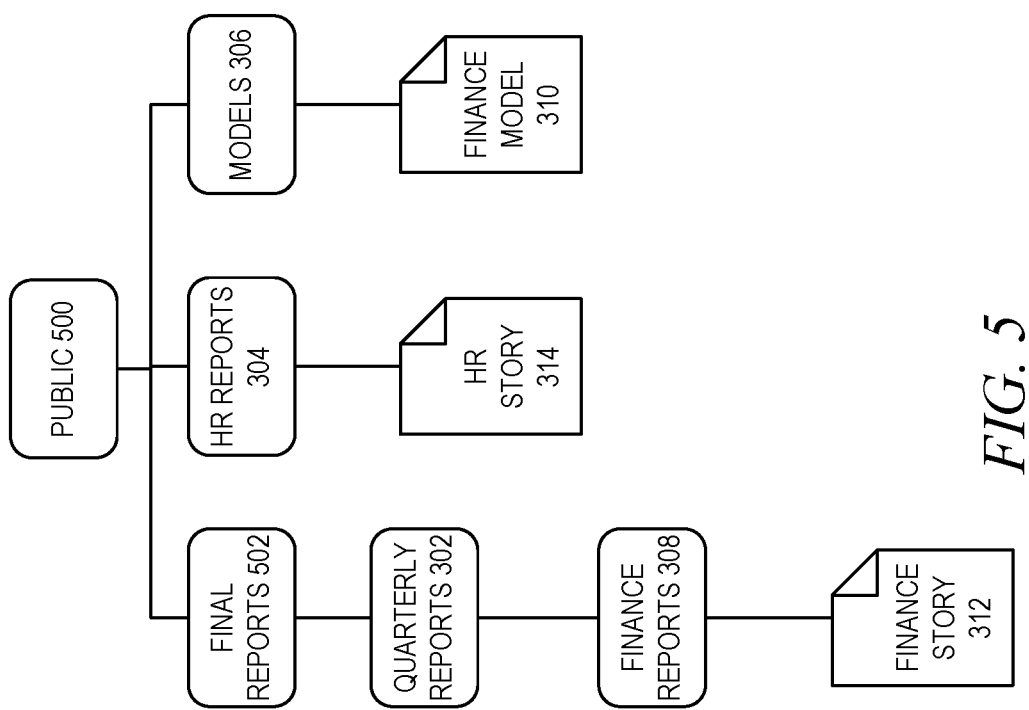
FIG. 5 is a diagram illustrating a package having been provisioned and shared to an Analytic Cloud tenant where a user has set destination folders for each individual folder in the package, in accordance with an example embodiment.

FIG. 5 is a diagram illustrating a package having been provisioned and shared to an Analytic Cloud tenant where a user has set destination folders for each individual folder in the package, in accordance with an example embodiment. The user here has selected to install the models folder 306 directly under root 500, which causes document 310 to follow it. The user here has also selected to install the HR reports folder 304 directly under root 500, which causes document 314 to follow it. Lastly, the user has selected to install the quarterly reports folder 302 in a new folder called final reports 502. This causes any remaining folders and file still under the quarterly reports folder 302, namely Finance Reports folder 308 and document 312 to follow it.

FIG. 6 is a diagram illustrating a graphical user interface 600 for selecting destination folder(s) for a package in a destination Analytic Cloud tenant, in accordance with an example embodiment. Here, a user has selected a package with content displayed in the content area 602 of the display. An input field 604 is provided where a user can input a destination folder to install the package as a 'whole, \ by selecting to browse a destination tenant hierarchy by selecting button 606. Alternatively, the user can select to turn an override folder import location button 608 on, which allows the user to then enter individual locations for individual folders in area 610.

Figure 7:
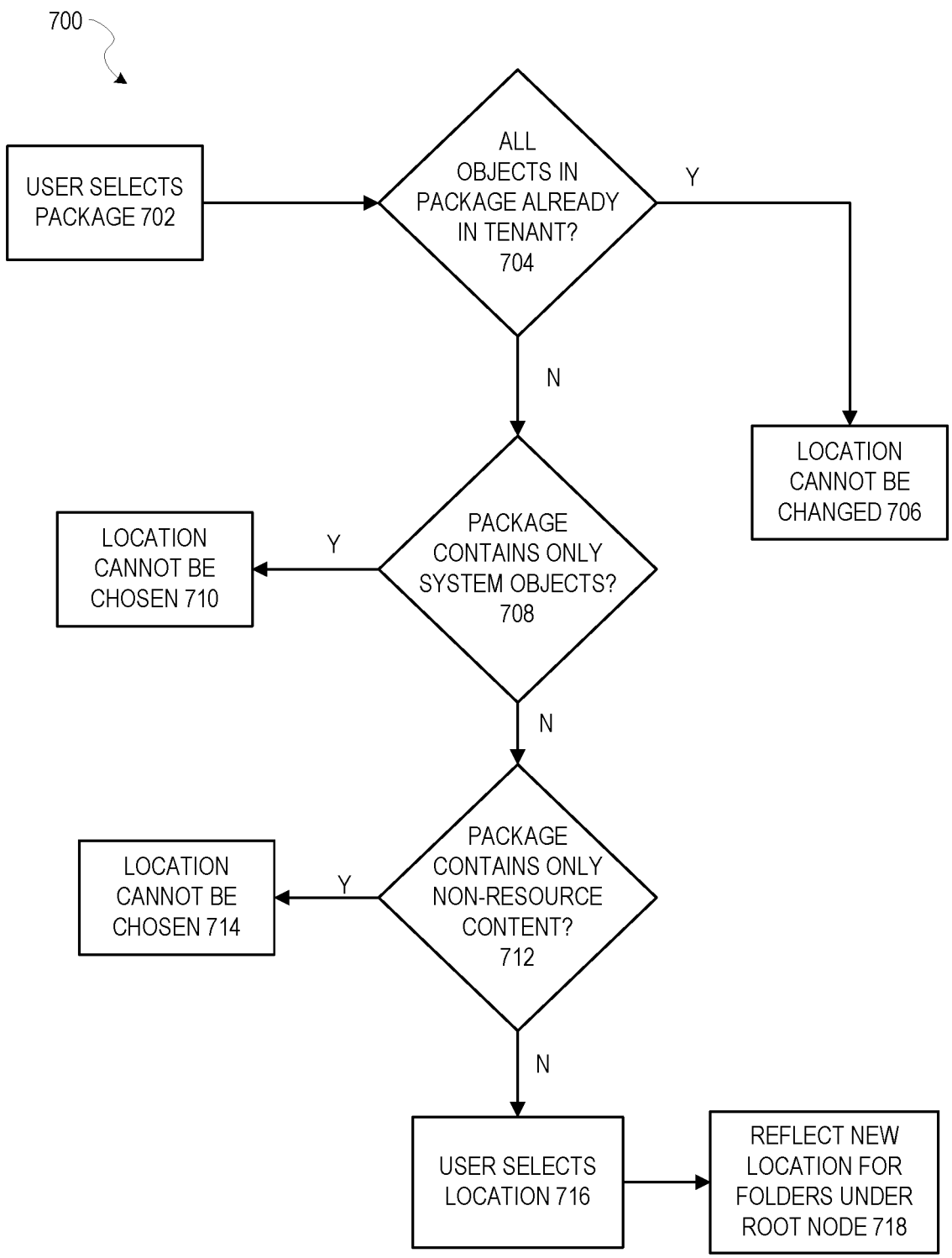
FIG. 7 is a flow diagram illustrating a method for performing a location change of a content package in a destination Analytic Cloud tenant, in accordance with an example embodiment.

It should be noted that there are some types of content whose location cannot be changed. These called non-resource objects, which may include system object or objects that have no hierarchical relationship to the other objects, such as currency objects and dimension objects. FIG. 7 is a flow diagram illustrating a method 700 for performing a location change of a content package in a destination Analytic Cloud tenant, in accordance with an example embodiment. At operation 702, a user selects the package. At operation 704, it is determined if all the objects in the package already exist in the tenant. If so, then at operation 706 the location cannot be changed.

If not, then at operation 708 it is determined if the package contains only system objects. If so, then at operation 710 the location cannot be chosen.

If not, then at operation 712 it is determined if the package contains only non-resource content. If so, then at operation 714 the location cannot be chosen.

If not, then at operation 716, the user can select the location. At operation 718, the new location is reflected for folders under the root node. Notably, however, this new location has no impact on system objects.

Whenever an Analysis Cloud package is created, a summary called package metadata is formed, which contains information such as the package version, list of objects in the package, and metadata for each object, the dependencies and relationships between the objects, etc. In short, the package metadata is an overview of the contents of the package. This is bundled with the actual contents of the package as a JavaScript™ Object Notation (JSON) file and stored in a persistence layer. Before the package is persisted, details such as the name of the package, description, and the list of objects present in the package are stored in a content manager service (CMS) database.

Whenever a user clicks on a package in any of the Analysis Cloud import pages (graphical user interfaces), a call goes to the CMS to get the details of the package, such as the name, description, other metadata, and the complete list of objects that are part of the package. After checking for the permissions, CMS fetches the package details from the CMS database to form the details, which is then sent to the Analysis Cloud Extended Applications Services (XS) engine, where additional detail, whether the object already exists in the system or not, is added to the package details and returned to CMS. CMS then sends the details to the user interface.

Figure 8:
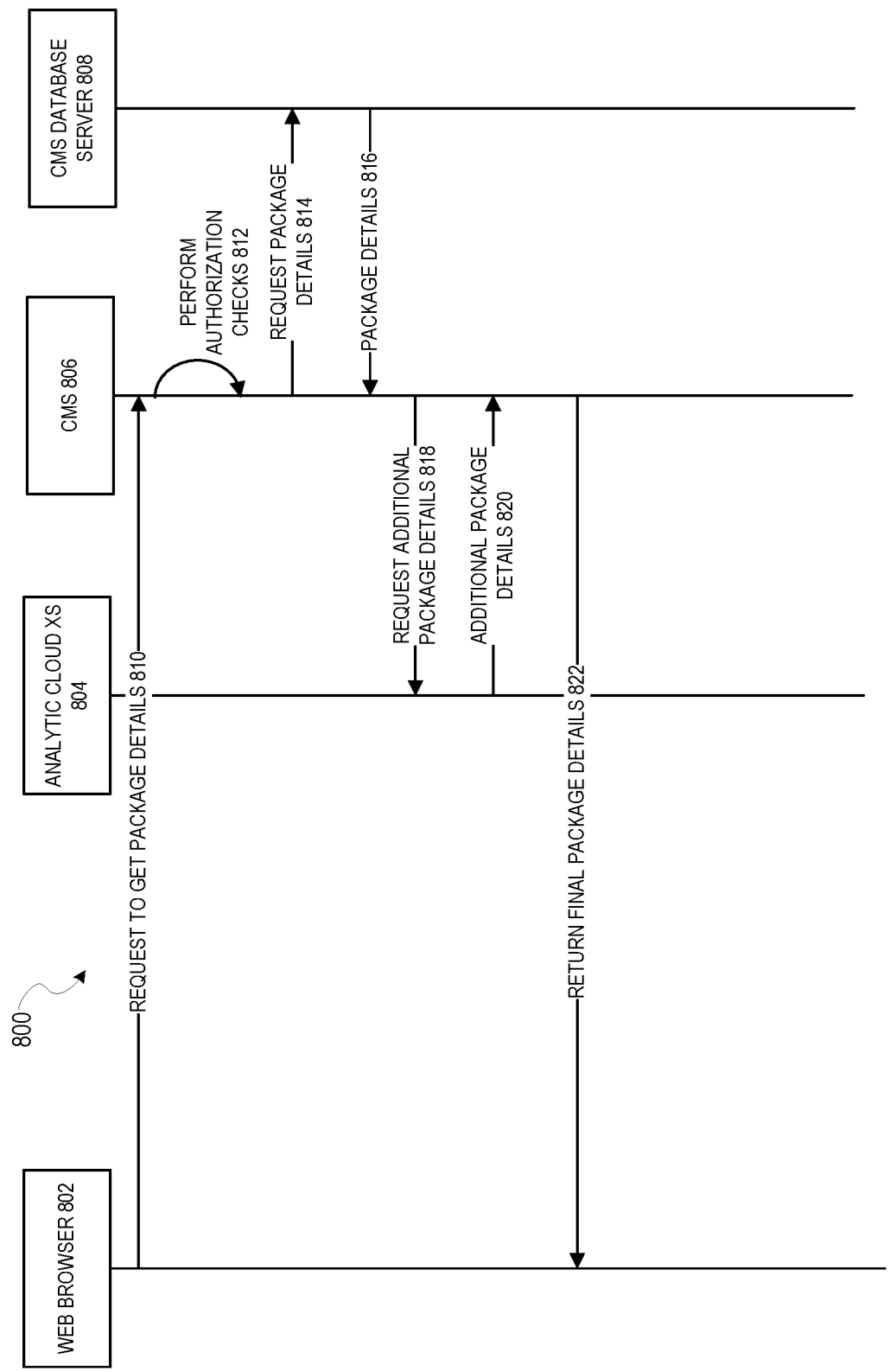
FIG. 8 is a sequence diagram illustrating a method for forming package details, in accordance with an example embodiment.

FIG. 8 is a sequence diagram illustrating a method 800 for forming package details, in accordance with an example embodiment. The method 800 utilizes a web browser 802, Analysis Cloud XS Engine 804, CMS 806, and CMS database server 808. At operation 810, the web browser 802 send a request to CMS 808 to get the package details. At operation 812, CMS 806 performs one or more authorization checks to ensure that the user utilizing the web browser 802 is authorized to receive the package details. Assuming those authorization checks pass, at operation 814, CMS 806 requests the package details from the CMS database server 808, which are returned at operation 816.

At operation 818, CMS 806 requests additional package details from the Analysis Cloud XS Engine 804, which get returned at operation 820. Finally, at operation 822, CMS 806 returns the final package details to the web browser 802.

One technical challenge encountered is in forming the path both for packages create before and created after a schemas/design release causing hierarchical information to be stored in the package metadata (rather than merely parent node information, which for purposes of this disclosure shall not be interpreted as hierarchical information). For example, for packages created after a particular release version, the path information can be added as additional metadata, but for packages created prior to that release version, there is a challenge in how to form the path for each object in such packages.

In an example embodiment, for each tenant, resource metadata created, after the particular release version, for each object has a property called ancestorPath, which has the ancestor (multiple parents) information for the object, stored as an array of object names. For example, if a story exists in the location PUBLIC→Annual Reports→Finance Reports, it is represented in the resource metadata for that story as:
  ancestorPath": ["PUBLIC", "Annual Reports", "Finance Reports"].

This is contrast to resource metadata created prior to that particular release version, which would only contain direct parent information (e.g., Finance Reports). Hence, for packages newly created or edited after the particular release version, path information can be resolved by adding the already available ancestorPath property in the package metadata during export.

Resolving paths for resources in packages created prior to the particular release version is challenging because no additional metadata could be added to the existing packages. Thus, the parent node information is used, which is stored in metadata in the parentResID property for each object. This property indicates the immediate ancestor of that object. Thus, in an example embodiment, for such older packages, in CMS the package metadata is fetched from a persistence layer, and it is parsed to obtain the parentResId for each object. The ancestor path is set as null. The parentResId for each object is then retrieved before sending package details to the user interface.

In the user interface, if ancestorPath is null (which will be the case for older packages), the user interface acts to recursively find the parent for each object, until the root folder is reached, from the package details, which forms a reverse ancestor hierarchy for each object. This reverse ancestor hierarchy is then inverted to form the ancestor path for each object.

When any object is selected to be exported in the Analytical Content Network (ACN), all of its ancestors are selected automatically and included in the package in order to main the proper hierarchy, unless the user voluntarily unselects any ancestor.

Figure 9:
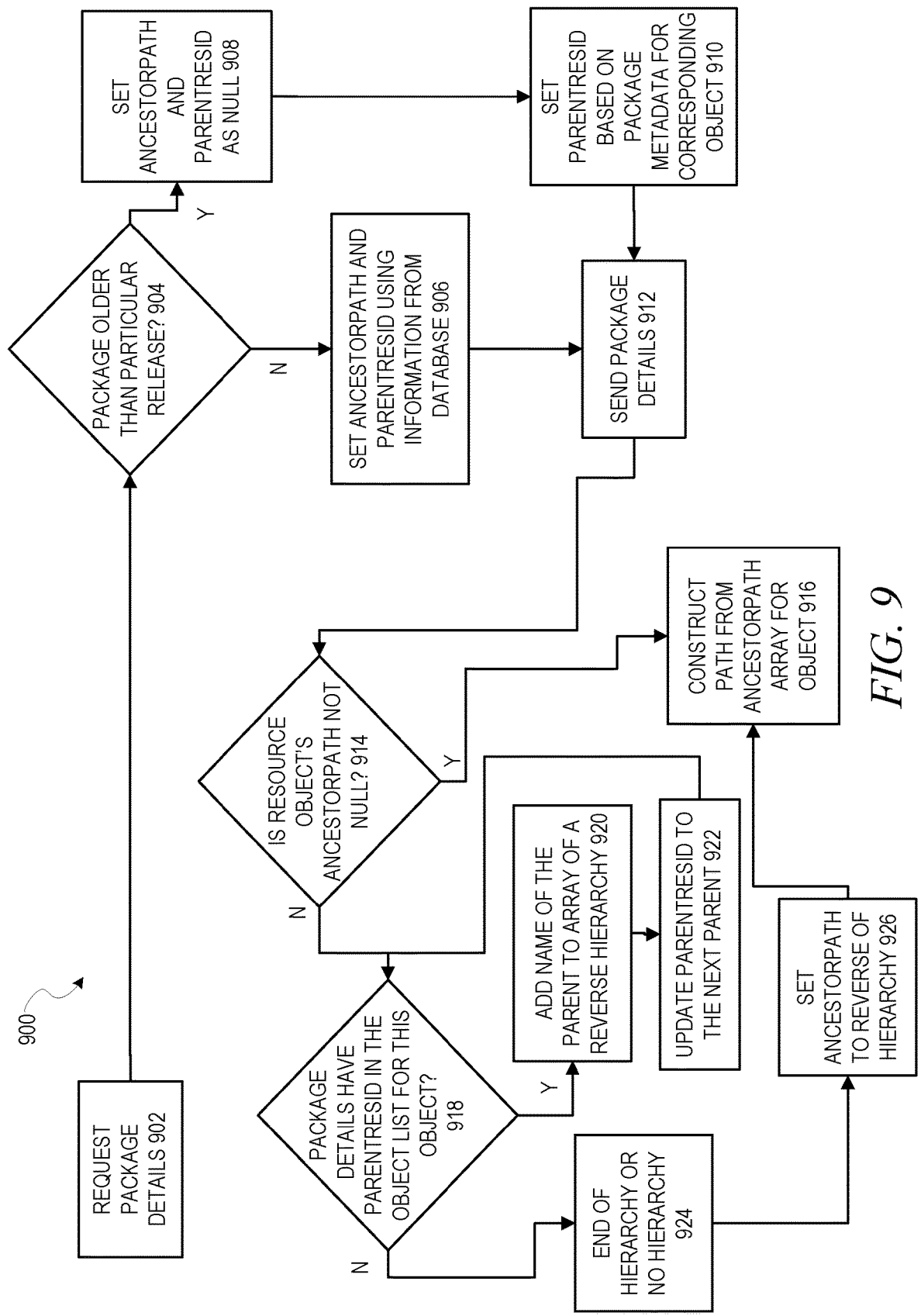
FIG. 9 is a flow diagram illustrating a method for resolving paths for objects in packages, in accordance with an example embodiment.

FIG. 9 is a flow diagram illustrating a method 900 for resolving paths for objects in packages, in accordance with an example embodiment. This method 900 includes operations performed at a user interface and CMS. At operation 902, the user interface requests the package details from CMS. At operation 904, CMS determines whether the package is older than the particular release version. If not, then at operation 906 CMS sets ancestorPath and parentResID using information from the database. If so, then at operation 908 CMS sets ancestorPath and parentResid both as null. Then, at operation 910, for each object, the parentResid is set based on the package metadata for that corresponding object.

At operation 912, the package details are then sent to the user interface. At operation 914, for each resource object in the public folder, it is determined if the resource object's ancestorPath is null. If not, then at operation 916 a path is constructed from the ancestorPath array for the object. If so, then at operation 918 it is determined if the package details have parentResID in the object list for this object. If so, then at operation 920 the name of the parent is added to an array of a reverse hierarchy. At operation 922, parentResid is updated to the next parent, and then the method 900 repeats to operation 918 for the next parent. If at operation 918 it was determined that the package details do not have parentResid in the object list, then at operation 924 it is the end of the hierarchy (or there is no hierarchy). At operation 926, ancestorPath is set to the reverse of the hierarchy, and then the method 900 proceeds to operation 916.

An additional technical challenge is in retaining the existing folder location of a resource while performing subsequent imports. For example, suppose the objects already existed in the system but at a different folder location as compared to the location in the package. In this scenario, if an import was attempted with the option to drop and recreate the resource, the resource would be moved from its current location in the system to the location that was maintained in the package. This is because the deletion and creation of objects are performed using the unique objectID as the identifier and the existing status of the object was not considered with this import option.

Thus, in an example embodiment, an existing folder location of a resource is retained by retaining the existing object's parentId as its parentResId, even after the object is deleted and created. Whenever import is performed with the option to drop and recreate the objects, for the resources that already exist in the system, an additional property called targetParentResId is set to its existing parentResId in import instructions just before deleting the resource. While importing a resource, if the targetParentResId has a value, then it is passed to the ContentLib API to create the resource as the child of the target parent resource ID. This will result in the existing folder hierarchy being retained in the target system regardless of what is the folder hierarchy in the package.

An additional technical challenge is that the user selected folder location should be trickled down to all descendant objects, and the relationship change between objects based on user's action should be managed using a dynamic Tree data structure. Thus, for example, assume that Folder1 contains Folder2, Story1, Model1 and Folder2 contains Story2. Folder2 is child of Folder1. The user selects "My Files/Public/path1" for Folder1. Folder2 is still child of Folder1. The user selects "My Files/Public/path2" for Folder2. At this point, Folder2 is no longer child of Folder1. The user then selects "My Files/Public/path3" for Folder1. This has no impact on Folder2 location.

In an example embodiment, a dynamic tree is created using package objects received. Based on user location chosen, the dynamic tree unlinks object(s) from old parent and links to new parent, but only if current and new parent object are different. Thus, only respective child nodes are updated upon location selection. The updated parent details along are then sent with other details to a backend.

Figure 10:
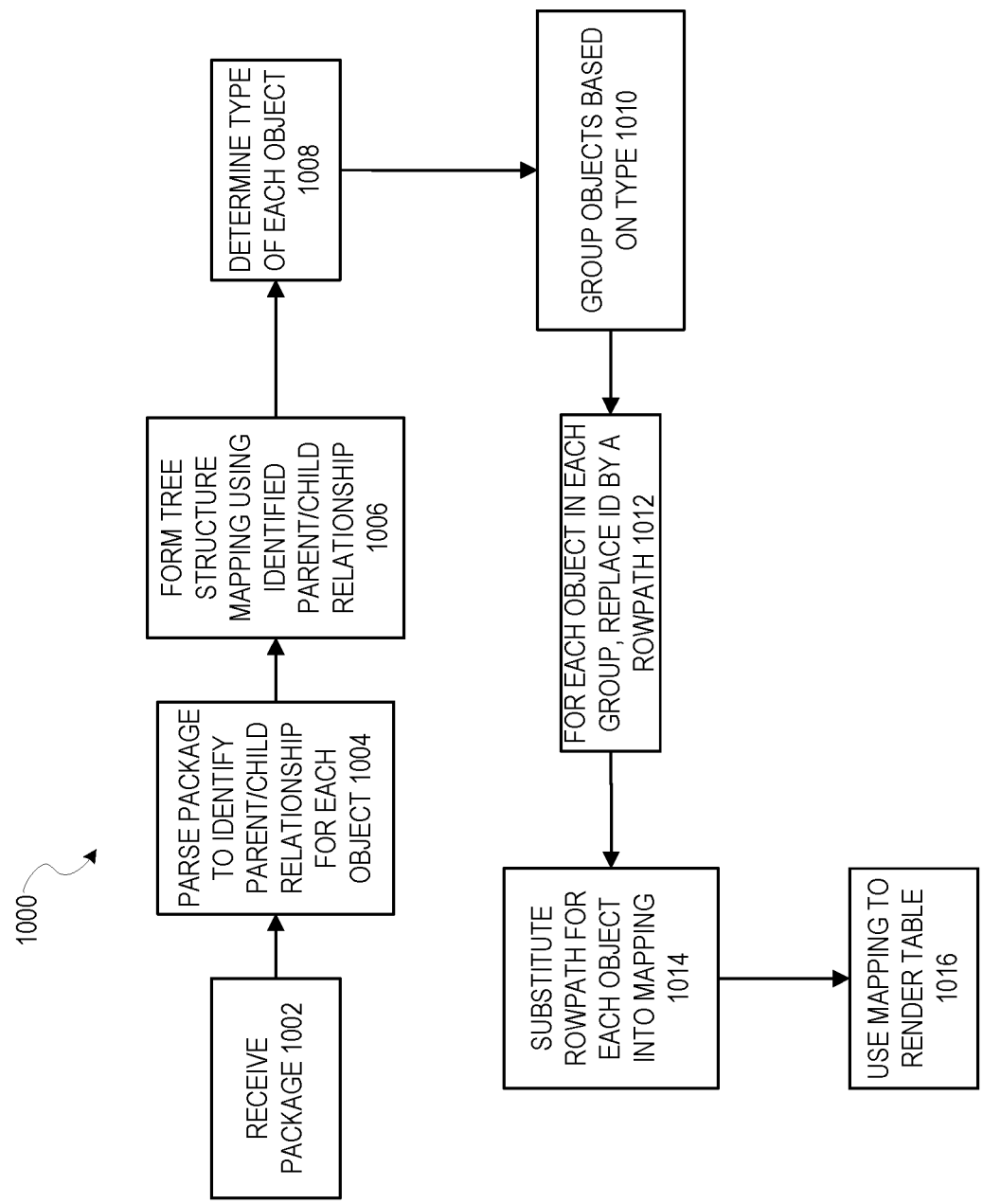
FIG. 10 is a flow diagram illustrating a method for changing a location of a folder in a tree structure, in accordance with an example embodiment.

FIG. 10 is a flow diagram illustrating a method 1000 for changing a location of a folder in a tree structure, in accordance with an example embodiment. At operation 1002, a package is received. At operation 1004, the package is parsed to identify a parent/child relationship for each object (except for a root object, which has no parent). At operation 1006, a tree structure mapping is formed using the identified parent/child relationships. This involves storing the parent/child relationship at each object in the tree (such as by storing a childID for each object, except for leaf objects, which have no child). Since each object received in the response carries the parent information, a mapping of parentId to an array of childId collection is used to create the tree structure. At operation 1008, the type of each object is determined (e.g., folder, story, model, and dimension). Each object type may have a unique index value assigned to it. At operation 1010, objects are grouped based on type (e.g., folders with folders, stories with stories, etc.). At operation 1012, for each object in each group, the id for each object is replaced by a rowpath indicating an object type and an object identification for the object (e.g., if the index for a folder type is 0 and the particular object being examined is the second folder in the tree it may have an ID of 1, in which case this second folder may have a rowpath of 0/1.

Once all objects have been assigned a rowpath, at operation 1014, the rowpath for each object substituted into the mapping. At operation 1016, the mapping is then used to render a table. Whenever a user chooses a new location, table control events may be used to know which rowpath is modified, and the rowPath can then be updated accordingly in the array.

Figure 11:
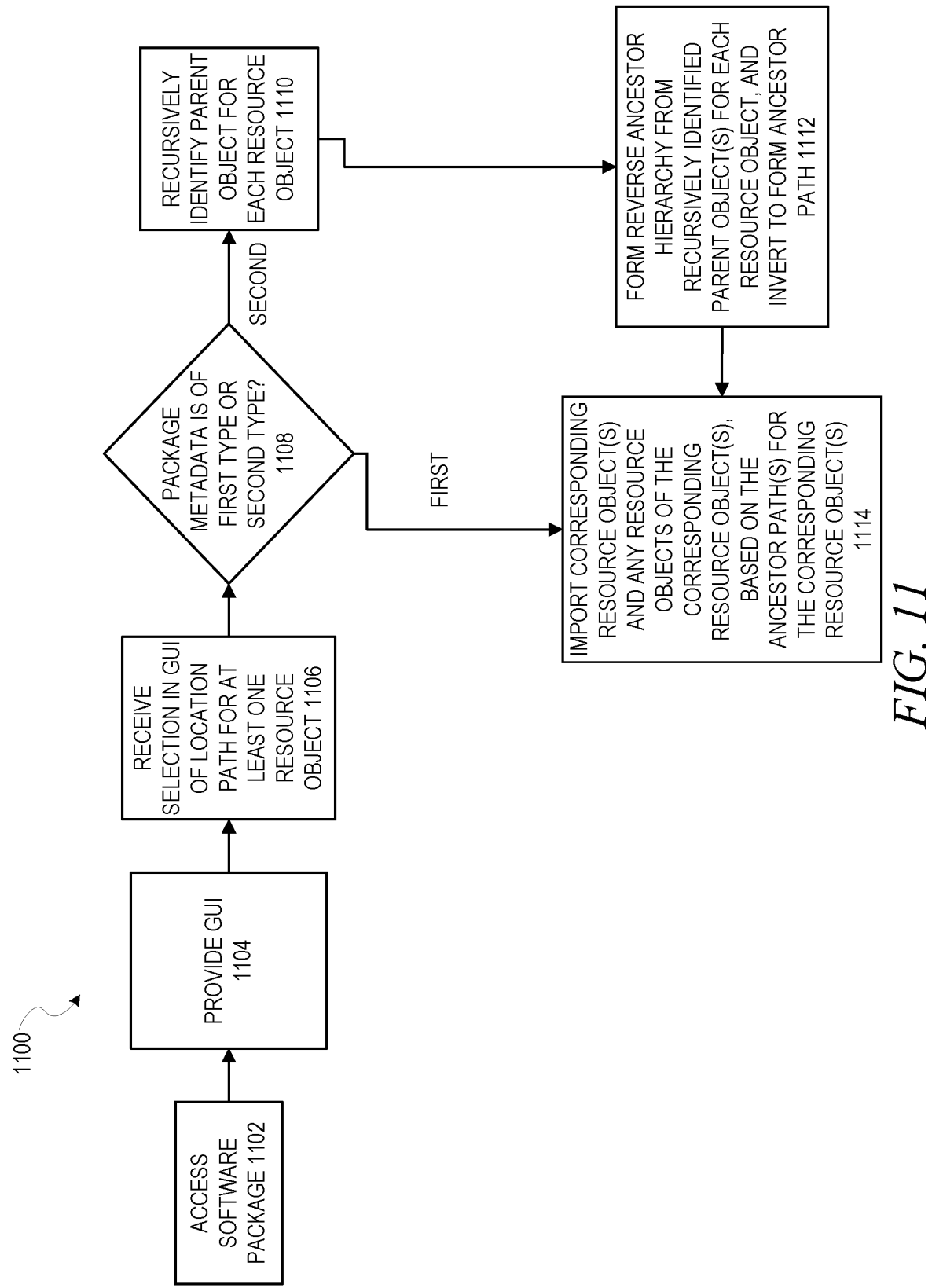
FIG. 11 is a flow diagram illustrating a method for importing a software package into a tenant, in accordance with an example embodiment.

FIG. 11 is a flow diagram illustrating a method 1100 for importing a software package into a tenant, in accordance with an example embodiment. At operation 1102, a software package comprising a plurality of software objects and package metadata is accessed. At operation 1104, a graphical user interface is provided, including a first area in which details about the software objects are displayed and a second area where a user can select a location path, in an analytic cloud tenant on which the package is to be imported, for at least one resource object in the plurality of software objects. At operation 1106, a selection, in the graphical user interface, of the location path for the at least one resource object, is received. At operation 1108, it is determined whether the package metadata is of a first type or a second type, the first type including information indicating both ancestor and descendant resource objects, if applicable, for each resource object in the plurality of software objects, the second type including information about a parent resource object but not descendant resource objects and not ancestor resource objects other than the parent resource object, for each resource object in the plurality of software objects. At operation 1110, in response to a determination that the package metadata is of a second type for each resource object in the plurality of software objects, a parent object is recursively identifying for each resource object in the plurality of software objects. At operation 1112, for each resource object in the plurality of software objects, a reverse ancestor hierarchy is formed from the recursively identified parent object(s), and the reverse ancestor hierarchy is inverted to form an ancestor path. Finally, at operation 1114, a corresponding resource object and any ancestor resource objects of the corresponding resource object are imported, at the selected location path, based on the ancestor path for the corresponding resource object. Operation 1114 is also visited if it was determined at operation 1108 that the package metadata is of the first type, in which case the ancestor path is present in the package metadata itself.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a computer-readable medium storing instructions that, when executed, cause the at least one hardware processor to perform operations comprising:
 accessing a software package comprising a plurality of software objects and package metadata;
 providing a graphical user interface including a first area in which details about the software objects are displayed and a second area where a user can select a location path, in an analytic cloud tenant on which the package is to be imported, for at least one resource object in the plurality of software objects;
 receiving a selection, in the graphical user interface, of the location path for the at least one resource object;
 in response to a determination that the package metadata is of a type that includes information about a parent resource object but not descendant resource objects and not ancestor resource objects other than the parent resource object, for each resource object in the plurality of software objects, recursively identifying a parent object for each resource object in the plurality of software objects; for each resource object in the plurality of software objects, forming a reverse ancestor hierarchy from the recursively identified parent object(s), and inverting the reverse ancestor hierarchy to form an ancestor path; and
 importing, at a selected location path, a corresponding resource object and any ancestor resource objects of the corresponding resource object, based on the ancestor path for the corresponding resource object.

Example 2. The system of Example 1, wherein second area of the graphical user interface provides a selectable graphical user interface object allowing a user to select to either import all objects within the software package to a specified location path or to individually select specified location paths for each resource object in the package.

Example 3. The system of Examples 1 or 2, wherein, in response to a user individually selecting specified location paths for each resource object in the package and in response to the user selecting a location path for a first resource object that is not descendant from a location path for a second resource object despite the second resource object being a descendant of the first resource object in the software package, altering the reverse ancestor hierarchy for the first object to remove reference to the second object, thus causing the first object and any descendant objects of the first object to no longer be descendants of the second object after importation.

Example 4. The system of any of Examples 1-3, wherein the software package is an Analytic Cloud software package.

Example 5. The system of Example 4, wherein the at least one resource object is content created using an Analytic Cloud content creator, the at least one resource object having a content type selected from the group consisting of folders, stories, models, connections, and Value-Drive Trees.

Example 6. The system of any of Examples 1-5, wherein the package metadata is of the first type if it was created on or after a specified release version and is of the second type if it was created prior to the specified release version.

Example 7. The system of any of Examples 1-6, wherein the first type includes information indicating both ancestor and descendant resource objects for each resource object in the plurality of software objects.

Example 8. A method comprising:
accessing a software package comprising a plurality of software objects and package metadata;
providing a graphical user interface including a first area in which details about the software objects are displayed and a second area where a user can select a location path, in an analytic cloud tenant on which the package is to be imported, for at least one resource object in the plurality of software objects;
receiving a selection, in the graphical user interface, of the location path for the at least one resource object;
in response to a determination that the package metadata is of a type that includes information about a parent resource object but not descendant resource objects and not ancestor resource objects other than the parent resource object, for each resource object in the plurality of software objects, recursively identifying a parent object for each resource object in the plurality of software objects;
for each resource object in the plurality of software objects, forming a reverse ancestor hierarchy from the recursively identified parent object(s), and inverting the reverse ancestor hierarchy to form an ancestor path; and
importing, at a selected location path, a corresponding resource object and any ancestor resource objects of the corresponding resource object, based on the ancestor path for the corresponding resource object.

Example 9. The method of Example 8, wherein second area of the graphical user interface provides a selectable graphical user interface object allowing a user to select to either import all objects within the software package to a specified location path or to individually select specified location paths for each resource object in the package.

Example 10. The method of Examples 8 or 9, wherein, in response to a user individually selecting specified location paths for each resource object in the package and in response to the user selecting a location path for a first resource object that is not descendant from a location path for a second resource object despite the second resource object being a descendant of the first resource object in the software package, altering the reverse ancestor hierarchy for the first object to remove reference to the second object, thus causing the first object and any descendant objects of the first object to no longer be descendants of the second object after importation.

Example 11. The method of any of Examples 8-10, wherein the software package is an Analytic Cloud software package.

Example 12. The method of Example 11, wherein the at least one resource object is content created using an Analytic Cloud content creator, the at least one resource object having a content type selected from the group consisting of folders, stories, models, connections, and Value-Drive Trees.

Example 13. The method of any of Examples 8-12, wherein the package metadata is of the first type if it was created on or after a specified release version and is of the second type if it was created prior to the specified release version.

Example 14. The method of any of Examples 8-13, wherein the first type includes information indicating both ancestor and descendant resource objects for each resource object in the plurality of software objects.

Example 15. A non-transitory machine-readable medium storing instructions which, when executed by one or more processors, cause the one or more processors to perform operations comprising:
accessing a software package comprising a plurality of software objects and package metadata;
providing a graphical user interface including a first area in which details about the software objects are displayed and a second area where a user can select a location path, in an analytic cloud tenant on which the package is to be imported, for at least one resource object in the plurality of software objects;
receiving a selection, in the graphical user interface, of the location path for the at least one resource object;
in response to a determination that the package metadata is of a type that includes information about a parent resource object but not descendant resource objects and not ancestor resource objects other than the parent resource object, for each resource object in the plurality of software objects, recursively identifying a parent object for each resource object in the plurality of software objects; for each resource object in the plurality of software objects, forming a reverse ancestor hierarchy from the recursively identified parent object (s), and inverting the reverse ancestor hierarchy to form an ancestor path; and
importing, at a selected location path, a corresponding resource object and any ancestor resource objects of the corresponding resource object, based on the ancestor path for the corresponding resource object.

Example 16. The non-transitory machine-readable medium storing instructions of Example 15, wherein second area of the graphical user interface provides a selectable graphical user interface object allowing a user to select to either import all objects within the software package to a specified location path or to individually select specified location paths for each resource object in the package.

Example 17. The non-transitory machine-readable medium storing instructions of Examples 15 or 16, wherein, in response to a user individually selecting specified location paths for each resource object in the package and in response to the user selecting a location path for a first resource object that is not descendant from a location path for a second resource object despite the second resource object being a descendant of the first resource object in the software package, altering the reverse ancestor hierarchy for the first object to remove reference to the second object, thus causing the first object and any descendant objects of the first object to no longer be descendants of the second object after importation.

Example 18. The non-transitory machine-readable medium storing instructions of any of Examples 15-17, wherein the software package is an Analytic Cloud software package.

Example 19. The non-transitory machine-readable medium storing instructions of Example 18, wherein the at least one resource object is content created using an Analytic Cloud content creator, the at least one resource object having a content type selected from the group consisting of folders, stories, models, connections, and Value-Drive Trees.

Example 20. The non-transitory machine-readable medium storing instructions of any of Examples 15-19, wherein the package metadata is of the first type if it was created on or after a specified release version and is of the second type if it was created prior to the specified release version.

Figure 12:
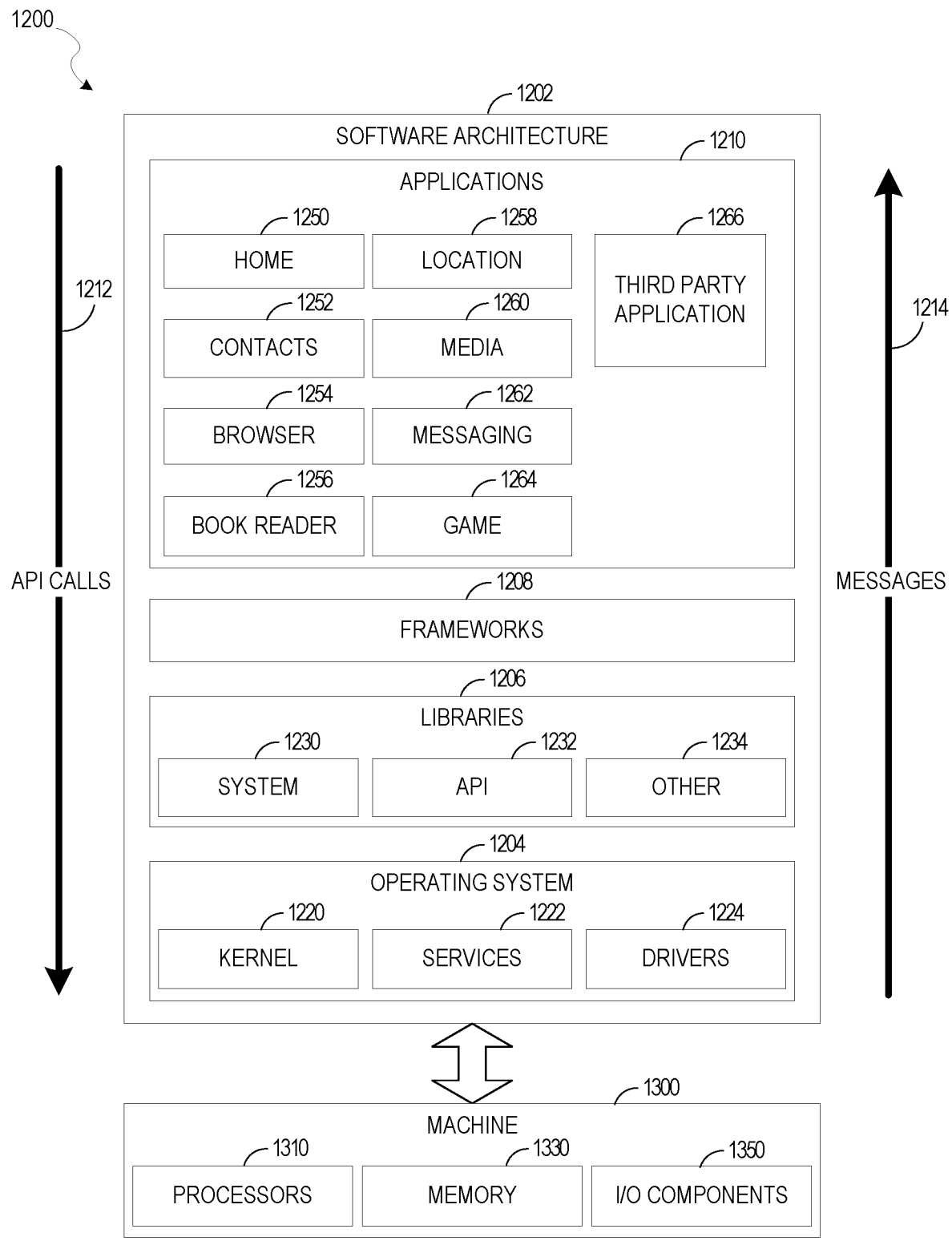
FIG. 12 is a block diagram illustrating a software architecture, which can be installed on any one or more of the devices described above.

FIG. 12 is a block diagram 1200 illustrating a software architecture 1202, which can be installed on any one or more of the devices described above. FIG. 12 is merely a non-limiting example of a software architecture, and it will be appreciated that many other architectures can be implemented to facilitate the functionality described herein. In various embodiments, the software architecture 1202 is implemented by hardware such as a machine 1300 of FIG. 13 that includes processors 1310, memory 1330, and input/output (I/O) components 1350. In this example architecture, the software architecture 1202 can be conceptualized as a stack of layers where each layer may provide a particular functionality. For example, the software architecture 1202 includes layers such as an operating system 1204, libraries 1206, frameworks 1208, and applications 1210. Operationally, the applications 1210 invoke Application Program Interface (API) calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers, consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware. For instance, the drivers 1224 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210. For example, the frameworks 1208 provide various graphical user interface (GUI) functions, high-level resource management, high-level location services, and so forth. The frameworks 1208 can provide a broad spectrum of other APIs that can be utilized by the applications 1210, some of which may be specific to a particular operating system 1204 or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications, such as a third-party application 1266. The applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third-party application 1266 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 1266 can invoke the API calls 1212 provided by the operating system 1204 to facilitate functionality described herein.

Figure 13:
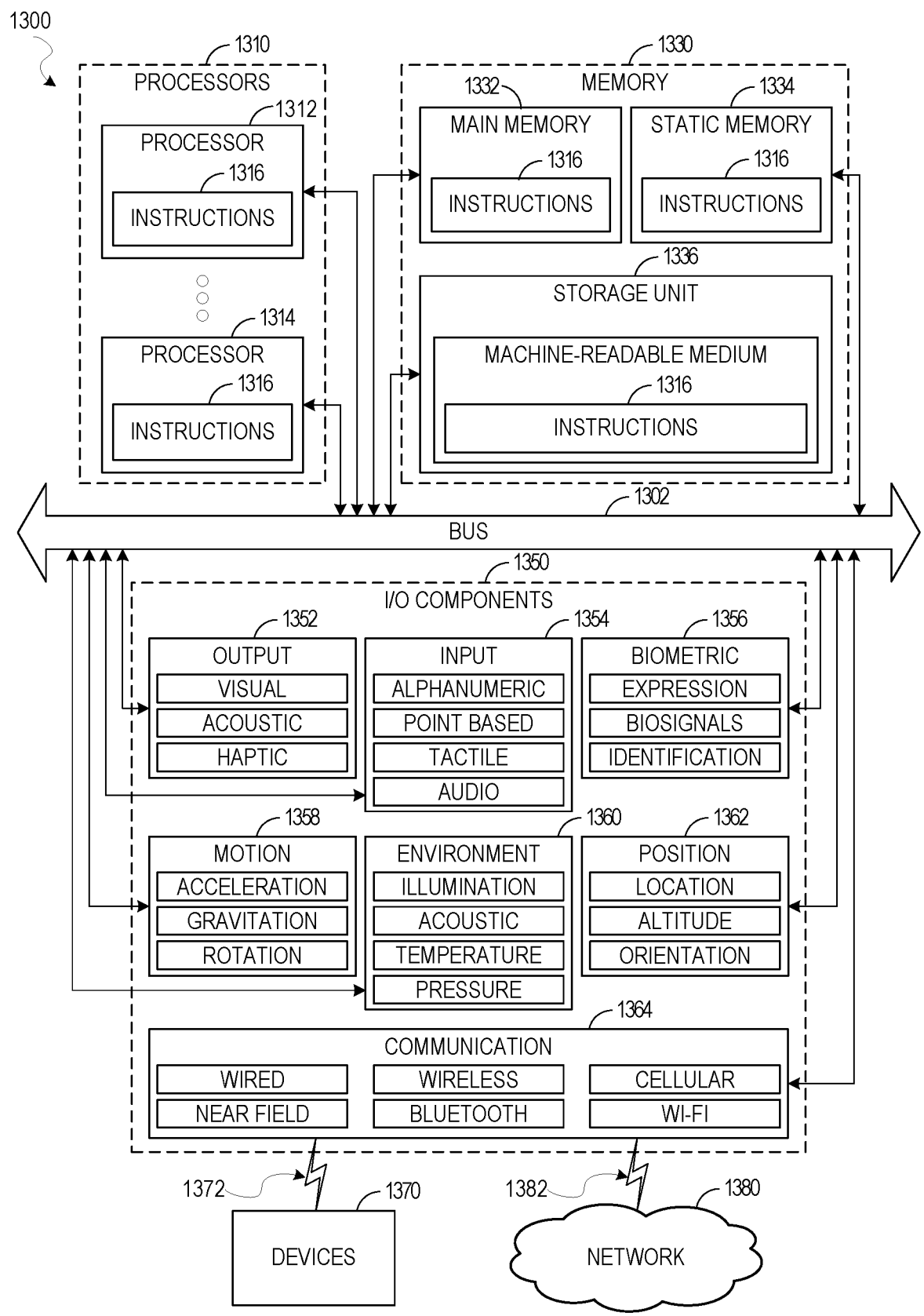
FIG. 13 illustrates a diagrammatic representation of a machine in the form of a computer system within which a set of instructions may be executed for causing the machine to perform any one or more of the methodologies discussed herein.

FIG. 13 illustrates a diagrammatic representation of a machine 1300 in the form of a computer system within which a set of instructions may be executed for causing the machine 1300 to perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example, the instructions 1316 may cause the machine 1300 to execute the method of FIG. 11. Additionally, or alternatively, the instructions 1316 may implement FIGS. 1-11 and so forth. The instructions 1316 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory 1330, and I/O components 1350, which may be configured to communicate with each other such as via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1312 and a processor 1314 that may execute the instructions 1316. The term "processor" is intended to include multi-core processors that may comprise two or more independent processors (sometimes referred to as "cores") that may execute instructions 1316 contemporaneously. Although FIG. 13 shows multiple processors 1310, the machine 1300 may include a single processor 1312 with a single core, a single processor 1312 with multiple cores (e.g., a multi-core processor 1312), multiple processors 1312, 1314 with a single core, multiple processors 1312, 1314 with multiple cores, or any combination thereof.

The memory 1330 may include a main memory 1332, a static memory 1334, and a storage unit 1336, each accessible to the processors 1310 such as via the bus 1302. The main memory 1332, the static memory 1334, and the storage unit 1336 store the instructions 1316 embodying any one or more of the methodologies or functions described herein. The instructions 1316 may also reside, completely or partially, within the main memory 1332, within the static memory 1334, within the storage unit 1336, within at least one of the processors 1310 (e.g., within the processor's cache memory), or any suitable combination thereof, during execution thereof by the machine 1300.

The I/O components 1350 may include a wide variety of components to receive input, provide output, produce output, transmit information, exchange information, capture measurements, and so on. The specific I/O components 1350 that are included in a particular machine will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion, and the grouping is in no way limiting. In various example embodiments, the I/O components 1350 may include output components 1352 and input components 1354. The output components 1352 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environmental components 1360, or position components 1362, among a wide array of other components. For example, the biometric components 1356 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1362 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or another suitable device to interface with the network 1380. In further examples, the communication components 1364 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., coupled via a USB).

Moreover, the communication components 1364 may detect identifiers or include components operable to detect identifiers. For example, the communication components 1364 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1364, such as location via Internet Protocol (IP) geolocation, location via Wi-Fi® signal triangulation, location via detecting an NFC beacon signal that may indicate a particular location, and so forth.

The various memories (i.e., 1330, 1332, 1334, and/or memory of the processor(s) 1310) and/or the storage unit 1336 may store one or more sets of instructions 1316 and data structures (e.g., software) embodying or utilized by any one or more of the methodologies or functions described herein. These instructions (e.g., the instructions 1316), when executed by the processor(s) 1310, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1380 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, the instructions 1316 may be transmitted or received using a transmission medium via the coupling 1372 (e.g., a peer-to-peer coupling) to the devices 1370. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1316 for execution by the machine 1300, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
    at least one hardware processor; and
    a computer-readable medium storing instructions that, when executed, cause the at least one hardware processor to perform operations comprising:
    accessing a software package comprising a plurality of software objects;
    providing a graphical user interface including a first area in which details about the software objects are displayed and a second area where a user can select a location path for at least one resource object in the plurality of software objects;
    receiving a selection, in the graphical user interface, of the location path for the at least one resource object;
    recursively identifying a parent object for each resource object in the plurality of software objects;
    for each resource object in the plurality of software objects, forming a reverse ancestor hierarchy from each of the recursively identified parent object(s), and inverting the reverse ancestor hierarchy to form an ancestor path; and
    importing, at a selected location path, a corresponding resource object and any ancestor resource objects of the corresponding resource object, based on the ancestor path for the corresponding resource object.

2. The system of claim 1, wherein second area of the graphical user interface provides a selectable graphical user interface object allowing a user to select to either import all objects within the software package to a specified location path or to individually select specified location paths for each resource object in the package.

3. The system of claim 1, wherein, in response to a user individually selecting specified location paths for each resource object in the package and in response to the user selecting a location path for a first resource object that is not descendant from a location path for a second resource object despite the second resource object being a descendant of the first resource object in the software package, altering the reverse ancestor hierarchy for the first object to remove reference to the second object, thus causing the first object and any descendant objects of the first object to no longer be descendants of the second object after importation.

4. The system of claim 1, wherein the software package is an Analytic Cloud software package.

5. The system of claim 4, wherein the at least one resource object is content created using an Analytic Cloud content creator, the at least one resource object having a content type selected from the group consisting of folders, stories, models, connections, and Value-Drive Trees.

6. The system of claim 1, wherein the software package includes package metadata of a first type if it was created on or after a specified release version and is of a second type if it was created prior to the specified release version.

7. The system of claim 6, wherein the first type includes information indicating both ancestor and descendant resource objects for each resource object in the plurality of software objects.

8. A method comprising:
accessing a software package comprising a plurality of software objects;
providing a graphical user interface including a first area in which details about the software objects are displayed and a second area where a user can select a location path for at least one resource object in the plurality of software objects;
receiving a selection, in the graphical user interface, of the location path for the at least one resource object;
recursively identifying a parent object for each resource object in the plurality of software objects;
for each resource object in the plurality of software objects, forming a reverse ancestor hierarchy from each of the recursively identified parent object(s), and inverting the reverse ancestor hierarchy to form an ancestor path; and
importing, at a selected location path, a corresponding resource object and any ancestor resource objects of the corresponding resource object, based on the ancestor path for the corresponding resource object.

9. The method of claim 8, wherein second area of the graphical user interface provides a selectable graphical user interface object allowing a user to select to either import all objects within the software package to a specified location path or to individually select specified location paths for each resource object in the package.

10. The method of claim 8, wherein, in response to a user individually selecting specified location paths for each resource object in the package and in response to the user selecting a location path for a first resource object that is not descendant from a location path for a second resource object despite the second resource object being a descendant of the first resource object in the software package, altering the reverse ancestor hierarchy for the first object to remove reference to the second object, thus causing the first object and any descendant objects of the first object to no longer be descendants of a second object after importation.

11. The method of claim 8, wherein the software package is an Analytic Cloud software package.

12. The method of claim 11, wherein the at least one resource object is content created using an Analytic Cloud content creator, the at least one resource object having a content type selected from the group consisting of folders, stories, models, connections, and Value-Drive Trees.

13. The method of claim 8, wherein the software package includes package metadata of a first type if it was created on or after a specified release version and is of a second type if it was created prior to the specified release version.

14. The method of claim 13, wherein the first type includes information indicating both ancestor and descendant resource objects for each resource object in the plurality of software objects.

15. A non-transitory machine-readable medium storing instructions which, when executed by one or more processors, cause the one or more processors to perform operations comprising:
accessing a software package comprising a plurality of software objects;
providing a graphical user interface including a first area in which details about the software objects are displayed and a second area where a user can select a location path for at least one resource object in the plurality of software objects;
receiving a selection, in the graphical user interface, of the location path for the at least one resource object;
recursively identifying a parent object for each resource object in the plurality of software objects;
for each resource object in the plurality of software objects, forming a reverse ancestor hierarchy from each of the recursively identified parent object(s), and inverting the reverse ancestor hierarchy to form an ancestor path; and
importing, at a selected location path, a corresponding resource object and any ancestor resource objects of the corresponding resource object, based on the ancestor path for the corresponding resource object.

16. The non-transitory machine-readable medium storing instructions of claim 15, wherein second area of the graphical user interface provides a selectable graphical user interface object allowing a user to select to either import all objects within the software package to a specified location path or to individually select specified location paths for each resource object in the package.

17. The non-transitory machine-readable medium storing instructions of claim 15, wherein, in response to a user individually selecting specified location paths for each resource object in the package and in response to the user selecting a location path for a first resource object that is not descendant from a location path for a second resource object despite the second resource object being a descendant of the first resource object in the software package, altering the reverse ancestor hierarchy for the first object to remove reference to the second object, thus causing the first object and any descendant objects of the first object to no longer be descendants of the second object after importation.

18. The non-transitory machine-readable medium storing instructions of claim 15, wherein the software package is an Analytic Cloud software package.

19. The non-transitory machine-readable medium storing instructions of claim 18, wherein the at least one resource object is content created using an Analytic Cloud content creator, the at least one resource object having a content type selected from the group consisting of folders, stories, models, connections, and Value-Drive Trees.

20. The non-transitory machine-readable medium storing instructions of claim 15, wherein the software package includes package metadata of a first type if it was created on or after a specified release version and is of a second type if it was created prior to the specified release version.

\* \* \* \* \*